US008269166B2

(12) United States Patent
Okumura

(10) Patent No.: US 8,269,166 B2

(45) Date of Patent: Sep. 18, 2012

(54) MS/MS MASS SPECTROMETER

(75) Inventor: Daisuke Okumura, Nagaokakyo (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/145,769

(22) PCT Filed: Feb. 5, 2009

(86) PCT No.: PCT/JP2009/000443

§ 371 (c)(1), (2), (4) Date: Jul. 21, 2011

(87) PCT Pub. No.: WO2010/089798

PCT Pub. Date: Aug. 12, 2010

(65) Prior Publication Data

US 2011/0284740 A1 Nov. 24, 2011

(51) Int. Cl.

*H01J 49/26* (2006.01)

*H01J 49/42* (2006.01)

*B01D 59/44* (2006.01)

(52) U.S. Cl. ......... 250/288; 250/281; 250/283; 250/282

(58) Field of Classification Search .................. 250/288, 250/281, 282, 283

See application file for complete search history.

(56) References Cited

U.S. PATENT DOCUMENTS 6,680,475 B2 * 1/2004 Krutchinsky et al. ......... 250/281
2010/0012835 A1 * 1/2010 Okumura et al. ............. 250/288
2010/0288922 A1 * 11/2010 Itoi et al. ....................... 250/289
2011/0006203 A1 * 1/2011 Fujita et al. ................... 250/288

FOREIGN PATENT DOCUMENTS

JP 07-201304 8/1995

OTHER PUBLICATIONS

International Preliminary Report on Patentability dated Sep. 13, 2011 and its English language translation for International application PCT/JP2009/000443.

API 4000™ LC/MS/MS System, Applied Biosystems Japan Kabushiki Kaisha, Feb. 2, 2009.

* cited by examiner

*Primary Examiner* — Nikita Wells

(74) *Attorney, Agent, or Firm* — DLA Piper LLP (US)

(57) ABSTRACT

A mass analysis of a standard sample having a known mass-to-charge ratio is carried out by performing a mass scan at a first-stage quadrupole (13) over a predetermined mass range, under the condition that a collision induced dissociation (CID) gas is introduced into a collision cell (14) and a voltage applied to a third-stage quadrupole (17) is set so that no substantial mass separation occurs in this quadrupole. Various kinds of product ions originating from a precursor ion selected by the first-stage quadrupole (13) arrive at and are detected by a detector (18) without being mass separated. Accordingly, based on the detection data, a data processor (25) can obtain a relationship between the voltage applied to the first-stage quadrupole (13) and the mass-to-charge ratio of the selected ions, with a time delay in the collision cell (14) reflected in that relationship. This relationship is stored in a calibration data memory (26), to be utilized in a neutral loss scan measurement or the like. By using this relationship, a mass shift due to the time delay in the collision cell (14) can be cancelled, so that the product ions can be detected with high sensitivity over the entire mass range. Furthermore, a mass spectrum having an accurate mass axis can be created.

6 Claims, 3 Drawing Sheets

Fig. 1
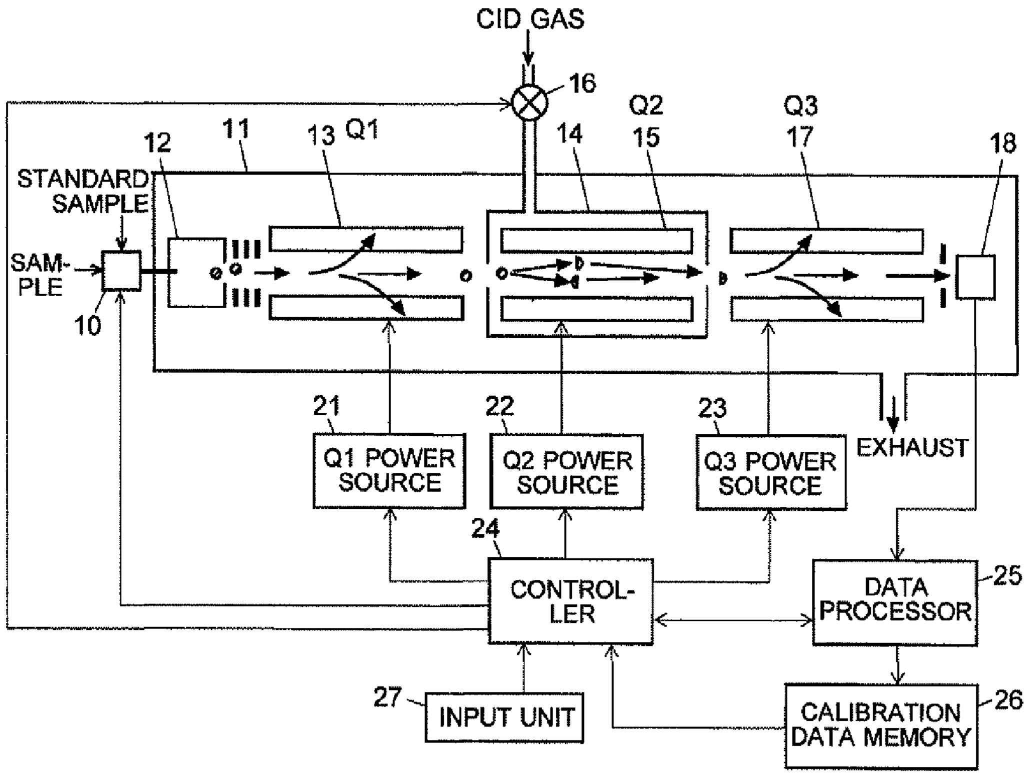
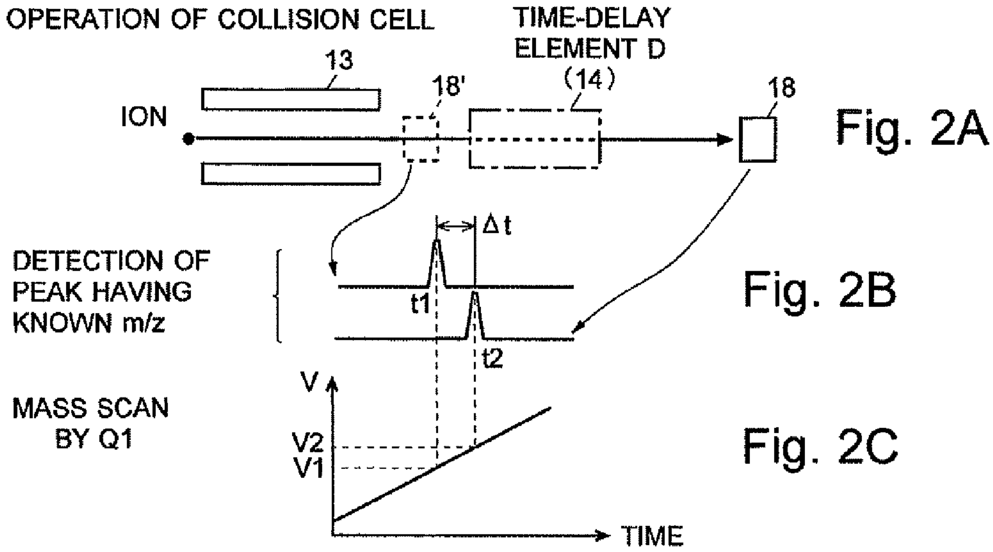
Fig. 2A
Fig. 2B
Fig. 2C

NEUTRAL LOSS SCAN

PRECURSOR ION SCAN

MS/MS MASS SPECTROMETER

CROSS-REFERENCE TO THE RELATED APPLICATIONS

This application is a national stage of international application No. PCT/JP2009/000443, filed on Feb. 5, 2009, the entire contents of which are incorporated herein by reference.

TECHNICAL FIELD

The present invention relates to an MS/MS mass spectrometer for dissociating an ion having a specific mass-to-charge ratio (m/z) by Collision-Induced Dissociation (CID) and for performing a mass analysis of product ions (fragment ions) generated by the dissociation.

BACKGROUND ART

An MS/MS analysis (which may also be referred to as a tandem analysis) is known as one of the mass spectrometric methods for identifying a substance with a large molecular weight and for analyzing its structure. A triple quadrupole (TQ) mass spectrometer is a typical MS/MS mass spectrometer. FIG. 6 is a schematic configuration diagram of a generally used triple quadrupole mass spectrometer disclosed in PATENT DOCUMENT 1 or other documents.

This mass spectrometer has an analysis chamber 11 evacuated by a vacuum pump (not shown). In this chamber 11, an ion source 12 for ionizing a sample to be analyzed, three quadrupoles 13, 15 and 17, each of which is composed of four rod electrodes, and a detector 18 for detecting ions and producing detection signals corresponding to the amount of detected ions, are arranged on an approximately straight line. A voltage composed of a DC voltage and a radio-frequency (RF) voltage is applied to the first-stage quadrupole (Q1) 13. Due to the effect of the quadrupole electric field generated by this composite voltage, only a target ion having a specific mass-to-charge ratio is selected as a precursor ion from various kinds of ions produced by the ion source 12. The mass-to-charge of the ion that is allowed to pass through the first-stage quadrupole 13 can be varied over a specific range by appropriately changing the DC voltage and the radio-frequency voltage applied to the first-stage quadrupole 13 while maintaining a specific relationship between them.

The second-stage quadrupole (Q2) 15 is contained in a highly airtight collision cell 14. A CID gas, such as argon (Ar) gas, is introduced into this collision cell 14. After being sent from the first-stage quadrupole 13 to the second-stage quadrupole 15, the precursor ion collides with the CID gas in the collision cell 14, to be dissociated into product ions by a CID process. This dissociation can occur in various forms. Normally, one kind of precursor ion produces plural kinds of product ions having different mass-to-charge ratios. These plural kinds of product ions are extracted from the collision cell 14 and introduced into the third-stage quadrupole (Q3) 17. In most cases, a pure radio-frequency voltage or a voltage generated by adding a DC bias voltage to the radio-frequency voltage is applied to the second-stage quadrupole 15 to make this quadrupole function as an ion guide for transporting ions to the subsequent stages while converging these ions.

Similar to the first-stage quadrupole 13, a voltage composed of a DC voltage and a radio-frequency voltage is applied to the third-stage quadrupole 17. Due to the effect of the quadrupole electric field generated by this voltage, only a product ion having a specific mass-to-charge ratio is selected in the third-stage quadrupole 17, and the selected ion reaches the detector 18. The mass-to-charge ratio of the ion that is allowed to pass through the third-stage quadrupole 17 can be varied over a specific range by appropriately changing the DC voltage and the radio-frequency voltage applied to the third-stage quadrupole 17 while maintaining a predetermined relationship between them. Based on the detection signals produced by the detector 18 during this operation, a data processor (not shown) creates a mass spectrum of the product ions resulting from the dissociation of the target ion.

As described in PATENT DOCUMENT 1, previously described mass spectrometer is capable of MS/MS analyses, such as a neutral loss scan measurement or precursor ion scan measurement. FIGS. 7A and 7B are model diagrams schematically showing how the mass-to-charge ratio of ions passing through the first-stage and third-stage quadrupoles 13 and 17 is changed in each of the aforementioned measurement modes: In the neutral loss scan measurement, as shown in FIG. 7A, a mass scan is performed while maintaining the mass difference (neutral loss) $\Delta M$, i.e. the difference between the mass-to-charge ratio of the ions passing through the first-stage quadrupole 13 and that of the ions passing through the third-stage quadrupole 17. In the precursor ion scan measurement, as shown in FIG. 7B, the mass-to-charge ratio of the ions passing through the first-stage quadrupole 13 is changed while that of the ions passing through the third-stage quadrupole 17 is fixed at a certain value.

Another mode of the measurement that can be performed using a MS/MS mass spectrometer is a so-called auto MS/MS analysis, in which a specific kind of precursor ion that matches predetermined conditions is automatically detected and subjected to an MS/MS analysis. In this technique, a normal mode of mass analysis, which does not involve any dissociation process in the collision cell 14 or a mass-separation process by the third-stage quadrupole 17, is carried out to obtain a mass spectrum, immediately after which a data processing for automatically detecting a peak that matches predetermined conditions is performed on each of the peaks appearing on that mass spectrum. Then, an MS/MS analysis is performed for the detected peak, with the mass-to-charge ratio of that peak as the precursor ion, to create a mass spectrum of product ions.

The triple quadrupole mass spectrometer can perform the previously described various modes of MS/MS analyses including a dissociating operation. However, the following problem occurs since the dissociation of ions in the collision cell 14 occurs in the middle of their flight through a vacuum atmosphere:

The gas pressure inside the collision cell 14 is maintained at around several hundred mPa due to the almost continuous supply of the CID gas into the collision cell 14. This pressure is considerably higher than the gas pressure inside the analysis chamber 11 and outside the collision cell 14. When ions travel through a radio-frequency electric field under such a relatively high gas pressure, they gradually lose their kinetic energy due to collision with the gas, which decreases their flight speed. Therefore, a significant time delay occurs when the ions pass through the collision cell 14.

In the neutral loss scan measurement, the mass-scan operations of the first-stage and third-stage quadrupoles 13 and 17 are linked with each other. If a significant time delay of the ions occurs in the collision cell 14, which is located between the two quadrupoles, the mass-to-charge ratio of the ions actually analyzed in the third-stage quadrupole 17 will be different from the desired mass-to-charge ratio for the mass analysis. This causes the mass-to-charge ratio of the neutral loss to be shifted from the intended value, with a possible deterioration in the analysis sensitivity. In the auto MS/MS analysis, a similar deterioration in sensitivity of the analysis can occur due to a shift of the mass-to-charge ratio of the precursor ion selected by the first cycle of the mass analysis.

Furthermore, in any of the aforementioned measurement modes, the time delay of the ions in the collision cell 14 is not reflected in the mass spectrum. This means that the mass axis of the mass spectrum may be significantly shifted, causing a problem in the quantitative or qualitative analysis based on the mass spectrum.

To reduce the influence of the time delay of the ions in the collision cell 14, it is necessary to lower the scan speed in the mass-scan operation. However, this broadens the time interval of a repetitive measurement and thereby increases the possibility of missing a component in an LC/MS or GC/MS analysis. In recent years, the delay of the ions has been considerably reduced as a result of the development of high-speed collision cells, such as the products marketed as LINIAC™ or T-Wave™ (see Non-Patent Documents 1 and 2). However, even when such a high-speed collision cell is used, ions require several milliseconds to pass through the cell, so that the aforementioned sensitivity deterioration or mass shift will inevitably occur when the mass-scan speed is increased to a level around 1000 u/sec or higher.

Patent Document 1: JP-A 07-201304

Non-Patent Document 1: API 4000™ LC/MS/MS System, [online], Applied Biosystems Japan Kabushiki Kaisha, [searched on Feb. 2, 2009], Internet Non-Patent Document 2: Tandem Quadrupole UPLC/MS Detector "ACQUITY™ TQD", [online], Nihon Waters K.K., [searched on Feb. 2, 2009], Internet

DISCLOSURE OF THE INVENTION

Problem to be Solved by the Invention

The present invention has been developed to solve the aforementioned problem, and one objective thereof is to provide an MS/MS mass spectrometer capable of preventing a mass shift or sensitivity deterioration in various modes of measurements, such as a neutral loss scan measurement, precursor ion scan measurement or auto MS/MS analysis.

Means for Solving the Problems

The first aspect of the present invention aimed at solving the aforementioned problem is an MS/MS mass spectrometer including a first mass separator for selecting, as a precursor ion, an ion having a specific mass-to-charge ratio from various kinds of ions, a collision cell for dissociating the precursor ion by making the precursor ion collide with a collision-induced dissociation (CID) gas, and a second mass separator for selecting an ion having a specific mass-to-charge ratio from various kinds of product ions created by dissociation of the precursor ion, and the MS/MS mass spectrometer further includes:

a) a calibrating analysis execution means for collecting mass analysis data by analyzing a sample having a known mass-to-charge ratio by performing a mass scan in the first mass separator under a condition that a CID gas is introduced into the collision cell while no substantial mass separation is performed in the second mass separator;

b) a calibration information memory means for creating mass calibration information for the first mass separator unit, based on the mass analysis data collected by the calibrating analysis execution means, the mass calibration information reflecting a time delay of an ion in the collision cell, and for memorizing the mass calibration information; and c) an actual analysis execution means for collecting mass analysis data for a target sample by controlling a mass-scan operation of the first mass separator by using the mass calibration information memorized in the calibration information memory means, at least when a neutral loss scan or a precursor ion scan is performed.

In the case of a normal type of MS/MS mass spectrometer, mass calibration information is obtained by performing a mass analysis of a standard sample having a known mass-to-charge ratio without introducing any CID gas into the collision cell. By contrast, in the MS/MS mass spectrometer according to the present invention, the mass analysis of the standard sample is performed in a manner similar to the normal MS/MS analysis, i.e. under the condition that a CID gas is introduced into the collision cell. During this process, an ion having a specific mass-to-charge ratio selected by the first mass separator is dissociated into product ions in the collision cell. These product ions are allowed to reach the detector in the form of a packet, i.e. without undergoing mass separation.

The period of time required for ions to pass through the first or second mass separator is sufficiently shorter than the period of time required for the ions to pass through the collision cell, which is maintained at a high pressure due to the introduction of the CID gas. Therefore, it is possible to consider that the mass analysis data collected by the calibrating analysis execution means reflects a time delay caused by the CID gas in the collision cell. Accordingly, based on this mass analysis data, the calibration information memory means creates and memorizes mass calibration information which reflects the time delay of the ions in the collision cell.

As in the case of the neutral loss scan or precursor ion scan, when a measurement including the mass-scan operation of the first mass separator and the dissociating operation of the collision cell is carried out, the actual measurement performance means controls the mass-scan operation of the first mass separator, using the mass calibration information memorized in the calibration information memory means. By using this information, the mass-scan operation is appropriately controlled so that the influence of a mass shift due to the time delay of the ions in the collision cell will be corrected. Therefore, for example, in a neutral loss scan measurement, neutral losses will be detected at correct mass-to-charge ratios as intended by the user, so that the target ions can be detected with high sensitivity. Furthermore, the shift of the mass axis of the mass spectrum will be cancelled.

The time delay of the ions passing through the collision cell depends on various factors, such as the pressure of the CID gas, the collision energy, and the mass-scan speed of the first mass separator. Accordingly, in a preferable mode of the MS/MS mass spectrometer according to the present invention, the calibrating analysis execution means collects mass analysis data under various conditions in which at least one among (a) the pressure of the CID gas in the collision cell, (b) the collision energy, and (c) the mass-scan speed of the first mass separator is varied in plural ways, and the calibration information memory means creates and memorizes mass calibration information for each different condition.

The second aspect of the present invention aimed at solving the aforementioned problem is an MS/MS mass spectrometer including a first mass separator for selecting, as a precursor ion, an ion having a specific mass-to-charge ratio from various kinds of ions, a collision cell for dissociating the precursor ion by making the precursor ion collide with a CID gas, and a second mass separator for selecting an ion having a specific mass-to-charge ratio from various kinds of product ions created by dissociation of the precursor ion, and the MS/MS mass spectrometer further includes:

a) an input means for allowing a user to input a difference in the mass-to-charge ratio between the first mass separator and the second mass separator in a neutral loss scan measurement, or to input information based on which the aforementioned difference in the mass-to-charge ratio can be determined;

b) a correction means for correcting the difference in the mass-to-charge ratio inputted through the input means or calculated on a basis of the aforementioned information, by adding a predetermined value to the difference in the mass-to-charge ratio; and c) a measurement execution means for controlling mass-scan operations of the first mass separator and the second mass separator so as to perform a neutral loss scan measurement based on the corrected value of the difference in the mass-to-charge ratio.

In the neutral loss scan measurement, if a significant time delay of ions occurs in the collision cell in the previously described manner, the arrival at the second mass separator of a target product ion originating from the precursor ion will be temporally delayed from the expected point in time. As a result, the actual difference between the mass-to-charge ratio of the ions selected in the first mass separator and that of the ions selected in the second mass separator decreases. Given this problem, in the MS/MS mass spectrometer according to the second aspect of the present invention, the correction means corrects the mass-to-charge ratio of the neutral loss specified by the user, to a value that exceeds the user-specified value by an amount corresponding to the time delay of the ions in the collision cell. This additional amount of the mass-to-charge ratio can be determined, for example, based on a value experimentally determined beforehand by a manufacturer of the device. It is naturally possible to add a function for obtaining the additional amount of the mass-to-charge ratio by measuring a standard sample or the like on the user's part.

To more accurately correct the mass shift, it is preferable for the MS/MS mass spectrometer according to the second aspect of the present invention to further include a memory means in which information on the additional value for correcting the difference in the mass-to-charge ratio is held for each of a variety of values in which at least one factor among (a) the pressure of the CID gas in the collision cell, (b) the collision energy, and (c) the mass-scan speed of the first mass separator is varied, and the correction means corrects the difference in the mass-to-charge ratio by using the information memorized in the memory means.

As just described, in the second aspect of the present invention, a mass-to-charge ratio value corresponding to the time delay of the ions in the collision cell is added to the mass-to-charge ratio of the neutral loss. Alternatively, the point of initiation of the mass-scan operation of the second mass separator may be delayed by a period of time corresponding to the aforementioned time delay to obtain an effect similar to the effect of the second aspect of the present invention.

Accordingly, the third aspect of the present invention aimed at solving the aforementioned problem is an MS/MS mass spectrometer including a first mass separator for selecting, as a precursor ion, an ion having a specific mass-to-charge ratio from various kinds of ions, a collision cell for dissociating the precursor ion by making the precursor ion collide with a CID gas, and a second mass separator for selecting an ion having a specific mass-to-charge ratio from various kinds of product ions created by dissociation of the precursor ion, and the MS/MS mass spectrometer further includes:

a) an input means for allowing a user to input a difference in the mass-to-charge ratio between the first mass separator and the second mass separator in a neutral loss scan measurement, or to input information based on which the aforementioned difference in the mass-to-charge ratio can be determined; and b) a measurement execution means for conducting mass-scan operations of the first mass separator and the second mass separator so as to perform a neutral loss scan measurement based on the difference in the mass-to-charge ratio inputted through the input means or calculated on a basis of the aforementioned information, wherein a point of initiation of the mass-scan operation of the second mass separator is delayed from a point of initiation of the mass-scan operation of the first mass separator by a previously determined period of time.

To correct the mass shift more accurately, it is preferable for the MS/MS mass spectrometer according to the third aspect of the present invention to further include a memory means in which time information used for delaying the point of initiation of the mass-scan operation of the second mass separator is held for each of a variety of values in which at least one factor among (a) the pressure of the CID gas in the collision cell, (b) the collision energy, and (c) the mass-scan speed of the first mass separator is varied, and the measurement execution means uses the time information held in the memory means to delay the initiation of the mass-scan operation of the second mass separator from the point of initiation of the mass-scan operation of the first mass separator by the previously determined period of time.

Effect of the Invention

The MS/MS mass spectrometer according to any of the first through third aspects of the present invention can perform a neutral loss scan measurement or precursor ion scan measurement with a reduced influence from the time delay which occurs when the ions pass through the collision cell, whereby the detection sensitivity for product ions is improved over the entire mass-scan range, and the accuracy of the mass axis of a mass spectrum created in the measurement is also improved. In the case of an auto MS/MS measurement, the detection sensitivity for product ions originating from a target ion is improved, and the accuracy of the mass axis of a mass spectrum created in the measurement is also improved.

BRIEF DESCRIPTION OF THE DRAWINGS

FIG. 1 is a schematic configuration diagram of a triple quadrupole mass spectrometer according to one embodiment (first embodiment) of the present invention.

FIGS. 2A to 2C is a model diagram for explaining an operation characteristic of the triple quadrupole mass spectrometer of the first embodiment.

EXPLANATION OF NUMERALS

Figure 3:
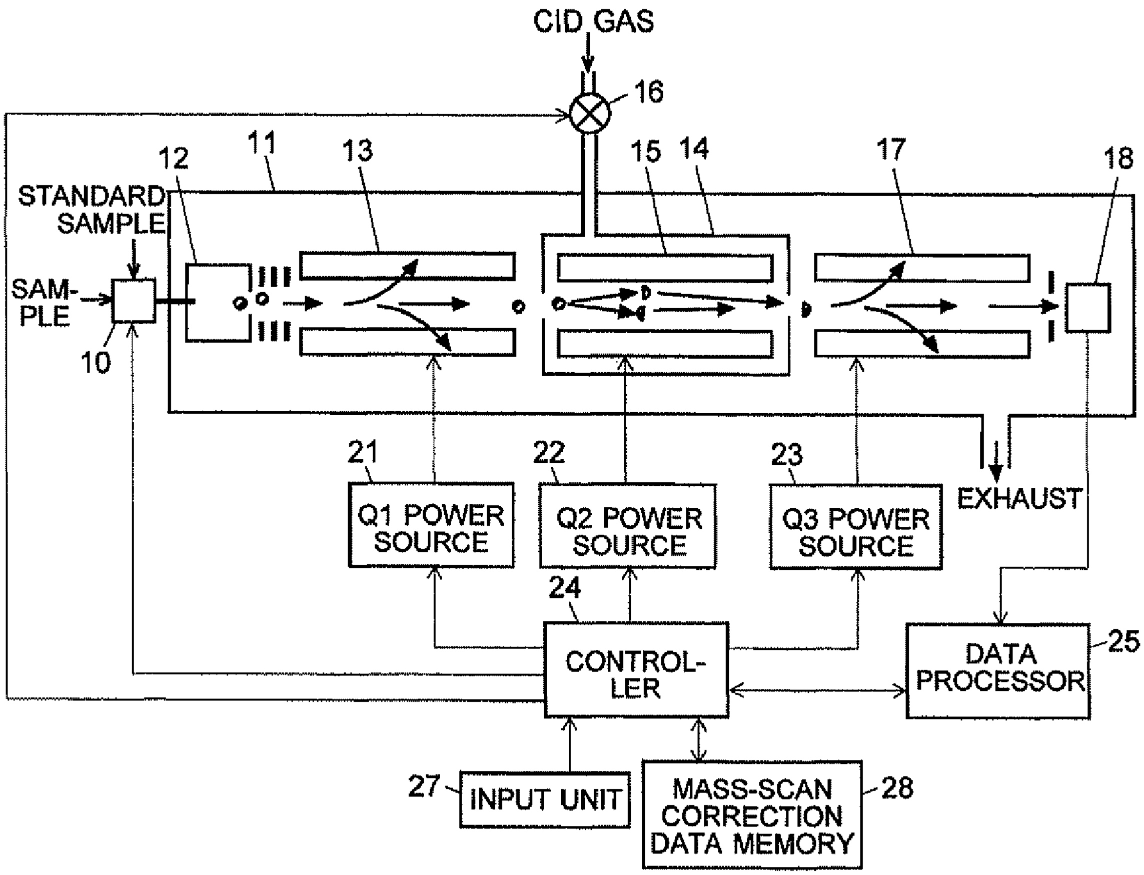
FIG. 3 is a schematic configuration diagram of a triple quadrupole mass spectrometer according to another embodiment (second embodiment) of the present invention.

10 . . . Sample Introduction Unit
11 . . . Analysis Chamber
12 . . . Ion Source
13 . . . First-Stage Quadrupole (Q1)
14 . . . Collision Cell
15 . . . Second-Stage Quadrupole (Q2)
16 . . . Gas Valve
17 . . . Third-Stage Quadrupole (Q3)
18 . . . Detector
21 . . . Q1 Power Source
22 . . . Q2 Power Source
23 . . . Q3 Power Source
24 . . . Controller
25 . . . Data Processor
26 . . . Calibration Data Memory
27 . . . Input Unit
28 . . . Mass-Scan Correction Data Memory

BEST MODE FOR CARRYING OUT THE INVENTION

[First Embodiment]

A triple quadrupole mass spectrometer as one embodiment (first embodiment) of the present invention is hereinafter described with reference to the attached drawings. FIG. 1 is a schematic configuration diagram of a triple quadrupole mass spectrometer of the present embodiment, and FIGS. 2A to 2C is model diagrams for explaining an operation characteristic of the triple quadrupole mass spectrometer of the present embodiment.

Similar to the conventional case, the triple quadrupole mass spectrometer of the present embodiment has a first-stage quadrupole 13 (which corresponds to the first mass separator of the present invention) and a third-stage quadrupole 17 (which corresponds to the second mass separator of the present invention), between which a collision cell 14 for dissociating a precursor ion to produce various kinds of product ions is located.

A Q1 power source 21 applies, to the first-stage quadrupole 13, either a composite voltage ±(U1+V1·cos ωt) including a DC voltage U1 and a radio-frequency voltage V1·cos ωt or a voltage ±(U1+V1·cos ωt)+Vbias1 including the aforementioned composite voltage with a predetermined DC bias voltage Vbias1 added thereto. A Q2 power source 22 applies, to the second-stage quadrupole 15, either a pure radio-frequency voltage ±V2·cos ωt or a voltage ±V2·cos ωt+Vbias2 including the radio-frequency voltage with a predetermined DC bias voltage Vbias2 added thereto. A Q3 power source 23 applies, to the third-stage quadrupole 17, either a composite voltage ±(U3+V3·cos ωt) including a DC voltage U3 and a radio-frequency voltage V3·cos ωt or a voltage ±(U3+V3·cos ωt)+Vbias3 including the aforementioned composite voltage with a predetermined DC bias voltage Vbias3 added thereto. The Q1, Q2 and Q3 power sources 21, 22 and 23 operate under the control of a controller 24.

The detection data obtained with a detector 18 is sent to a data processor 25, which creates a mass spectrum and performs a quantitative or qualitative analysis based on that mass spectrum. A calibration data memory 26 is connected to the data processor 25. The calibration data memory 26 is used to store mass calibration data computed by a measurement and data processing, which will be described later. The controller 24 uses the mass calibration data stored in the calibration data memory 26 to perform a control for the measurement.

An operation characteristic of the triple quadrupole mass spectrometer of the present embodiment is hereinafter described by means of FIGS. 2A to 2C. The present mass spectrometer requires collecting mass calibration data and saving the data in the calibration data memory 26 before the analysis of a target sample. For this purpose, the controller 24 conducts a measurement for mass calibration as follows:

Upon receiving a command for initiating the mass-calibration measurement, the controller 24 operates the sample introduction unit 10 to selectively introduce a standard sample having a known mass-to-charge ratio into the ion source 12, while opening a gas valve 16 to introduce a CID gas into the collision cell 14 at a predetermined flow rate so as to maintain the CID gas pressure in the collision cell 14 at a specific level. The controller 24 also operates the Q3 power source 23 to apply only a radio-frequency voltage to the third-stage quadrupole 17 so that the third-stage quadrupole 17 will merely converge ions without substantially mass-separating them. Alternatively, a composite voltage including a DC voltage U3 and a radio-frequency voltage with amplitude V3 may be applied to the third-stage quadrupole 17, with U3 and V3 being appropriately set so that the mass resolving power will be low enough to avoid mass separation of the product ions created by dissociation in the collision cell 14.

In a normal type of triple quadrupole mass spectrometer, no CID gas is introduced into the collision cell during the process of collecting mass calibration data which shows the relationship between the voltage applied to the first-stage quadrupole 13 and the thereby selected mass-to-charge ratio. By contrast, in the mass-calibration measurement performed by the triple quadrupole mass spectrometer of the present embodiment, a CID gas is introduced into the collision cell 14 to dissociate ions in the collision cell 14 in a manner similar to a normal MS/MS analysis, such as a neutral loss scan measurement.

Since the various kinds of product ions having different mass-to-charge ratios generated by dissociation are not mass separated in the third-stage quadrupole 17, the largest portion of the product ions originating from the same precursor ion remain in the form of a mass when arriving at the detector 18. The ions that have entered the collision cell 14 are decelerated due to collision with the CID gas since the gas pressure in this cell is higher than in the surrounding space. Accordingly, as shown in FIG. 2A, the state of the flight path of the ions during the mass-calibration measurement can be represented by a model in which a time-delay element D due to the collision cell 14 is provided between the first-stage quadrupole 13 and the detector 18. In the spaces outside the collision cell 14, the degree of vacuum is so high that the time delay of the ions in those spaces is negligible as compared to that of the ions in the collision cell 14. Therefore, when no CID gas is present in the collision cell 14 (and the gas pressure in the collision cell 14 is approximately equal to the gas pressure around the cell in the analysis chamber 11), it is possible to consider that the detector is located immediately after the exit of the first-stage quadrupole 13, as indicated by numeral 18' in FIG. 2A.

While the mass-scan operation is performed so that the mass-to-charge ratio of the ions passing through the first-stage quadrupole 13 changes over a predetermined mass range, when the temporal change of the signal obtained with the detector 18 is monitored, a peak formed by a group of product ions originating from the standard sample appears at around a certain point in time during the mass-scan period, as shown in FIG. 2B. When the time-delay element D is not present, the peak appears at time t1. When the time-delay element D is present, the peak appears at time t2, which is delayed from time t1 by time difference Δt since the time-delay element D makes the product ions slower to arrive at the detector 18. Even during the period of this time difference Δt, the mass-to-charge ratio of the ions passing through the first-stage quadrupole 13 continues changing. As a result, a mass shift occurs at the time-delay element D by an amount corresponding to the mass-to-charge ratio difference equivalent to the voltage difference V2-V1 in FIG. 2C.

Given that the known mass-to-charge ratio of the standard sample is Mr, if the time delay of the ions in the collision cell 14 is not taken into consideration, the voltage V1 should correspond to the mass-to-charge ratio Mr. If the time delay of the ions in the collision cell 14 is taken into consideration, the voltage V2 should correspond to the mass-to-charge ratio Mr. Accordingly, based on the mass calibration data collected in the mass-calibration measurement, the data processor 25 creates mass calibration data based on the relationship between the mass-scan voltage used at the point in time where the peak was detected and the mass-to-charge ratios of the components included in the standard sample. In general, a standard sample contains a plurality of standard reference materials having different mass-to-charge ratios. Therefore, it is possible to create accurate mass calibration data, with the influence of the time-delay element D reflected therein, by investigating the relationship between the voltage at which a peak appeared and the theoretical value of the mass-to-charge ratio for each standard reference material. The mass calibration data can be prepared in any form, such as a mathematical formula or a table.

The delay time of the ions due to the time-delay element D depends on the CID gas pressure in the collision cell 14, the kinetic energy that the ions possess when they enter the collision cell 14 (collision energy), and other factors. The former can be rephrased as the flow rate of the CID gas introduced into the collision cell 14, while the latter can be rephrased as the potential difference between the DC bias voltage applied to the collision cell 14 and the DC bias voltage applied to the first-stage quadrupole 13 located in the previous stage. Both the CID gas pressure and the collision energy are included in the dissociating conditions which affect the dissociation efficiency or other aspects of the measurement. When necessary, these conditions can be changed manually by a user or automatically by the system. Therefore, it is preferable to prepare optimal mass calibration data for each of such different dissociating conditions.

For this purpose, in the triple quadrupole mass spectrometer, the controller 24 conducts a mass-calibration measurement of the standard sample while changing the CID gas pressure in stages by regulating the opening of the gas valve 16, or changing the collision energy in stages by varying the DC bias voltage. Meanwhile, the data processor 25 collects mass calibration data under each of the different conditions. The collected mass calibration data, which show the relationship between the voltage applied to the first-stage quadrupole 13 and the mass-to-charge ratio to be measured, are stored in the calibration data memory 26, with the CID gas pressure, collision energy and other quantities as parameters.

When a command is given through the input unit 27 to perform a measurement including a mass-scan operation of the first-stage quadrupole 13 and a dissociating operation of the collision cell 14, such as a neutral loss scan measurement or precursor ion scan measurement on a target sample, the controller 24 retrieves, from the calibration data memory 26, a set of mass calibration data corresponding to the CID gas pressure and the collision energy at that point in time. The controller 24 uses the retrieved mass calibration data to control the Q1 power source 21 so that the voltage applied to the first-stage quadrupole 13 will vary over a specific range. The use of the mass calibration data reduces the influence of the time delay of the ions passing through the collision cell 14. Therefore, for example, when a neutral loss scan measurement is carried out, a product ion from which a specified neutral loss has desorbed can be detected with high sensitivity. Furthermore, a mass spectrum having an accurate mass axis can be created in the data processor 25.

[Second Embodiment]

Figure 4:
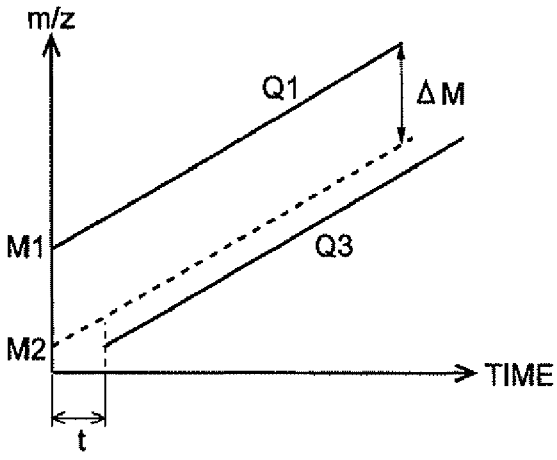
FIG. 4 is a model diagram for explaining an operation characteristic of the triple quadrupole mass spectrometer according to the second embodiment.

As another embodiment (second embodiment) of the present invention, a triple quadrupole mass spectrometer is hereinafter described by means of FIGS. 3 and 4. FIG. 3 is a schematic configuration diagram of the triple quadrupole mass spectrometer of the second embodiment, and FIG. 4 is a model diagram for explaining an operation characteristic of the triple quadrupole mass spectrometer of the second embodiment. In FIG. 3, the same components as used in the previously described triple quadrupole mass spectrometer of the first embodiment are denoted by the same numerals. In the triple quadrupole mass spectrometer of the second embodiment, a mass-scan correction data memory 28, in which a set of predetermined correction data is previously stored, is connected to the controller 24.

As already explained, when a CID gas is introduced into the collision cell 14 to dissociate ions, the ions undergo a significant time delay when passing through the collision cell 14. To address this problem, the mass spectrometer of the present embodiment is configured so that the point in time for initiating the mass-scan operation of the third-stage quadrupole 17 in a neutral loss scan measurement is delayed from the point in time for initiating the mass-scan operation of the first-stage quadrupole 13 by an amount corresponding to the time delay of the ions in the collision cell 14, rather than controlling the mass-scan operations of the first-stage and third-stage quadrupoles 13 and 17 so as to simply maintain a constant mass-to-charge ratio difference between them. FIG. 4 graphically shows the idea underlying the present embodiment, where t denotes the amount of time by which the initiation of the mass-scan operation of the third-stage quadrupole 17 is delayed. As already noted, the time delay of the ions in the collision cell 14 depends on the CID gas pressure, collision energy and other dissociating conditions. Accordingly, the time t should preferably be changed according to these dissociating conditions.

The value of time t most suitable for an appropriate neutral loss scan measurement can be experimentally determined beforehand by the manufacturer of the present device. Accordingly, on the manufacturer's side, an appropriate value of t is determined under various dissociating conditions and the obtained values are stored as correction data in the mass-scan correction data memory 28. When a neutral loss scan measurement is performed on the user's side, the controller 24 determines the mass-to-charge ratio difference ΔM according to the mass-to-charge ratio of the neutral loss specified through the input unit 27, and retrieves, from the mass-scan correction data memory 28, the value of time t corresponding to the dissociating condition at that point in time. Then, the controller 24 determines a mass-scan pattern for the first-stage quadrupole 13 and the third-stage quadrupole 17 as shown in FIG. 4, and controls the Q1 power source 21 and the Q3 power source 23 according to that pattern. As a result, a product ion from which the specified neutral loss has been desorbed can be detected with high sensitivity in the neutral loss scan measurement. Furthermore, a mass spectrum having an accurate mass axis can be created in the data processor 25.

[Third Embodiment]

Figure 5:
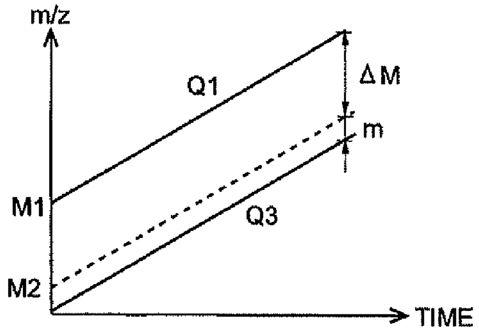
FIG. 5 is a model diagram showing an operation characteristic of a triple quadrupole mass spectrometer according to another embodiment (third embodiment) of the present invention.
Figure 6:
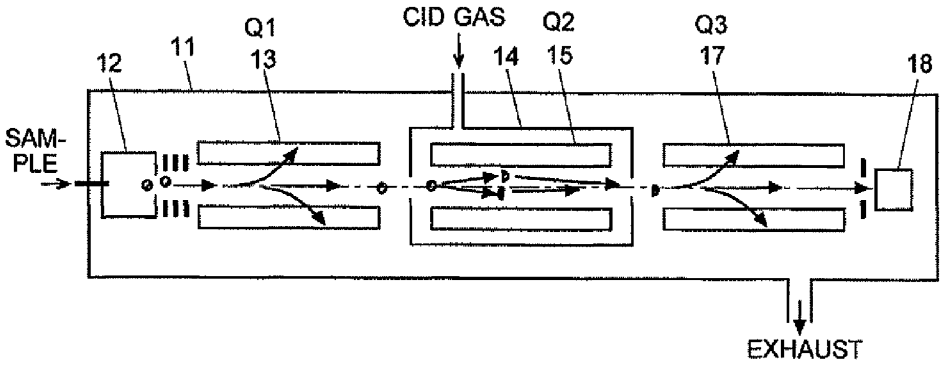
FIG. 6 is a schematic configuration diagram of a conventional and common type of quadrupole mass spectrometer.
Figure 7A:
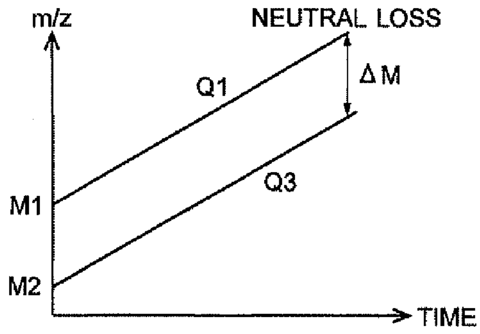
FIGS. 7A and 7B are model diagrams showing a change in the mass-to-charge ratio of the ions selected by the first-stage and third-state quadrupoles in a neutral loss scan measurement and a precursor ion scan measurement.
Figure 7B:
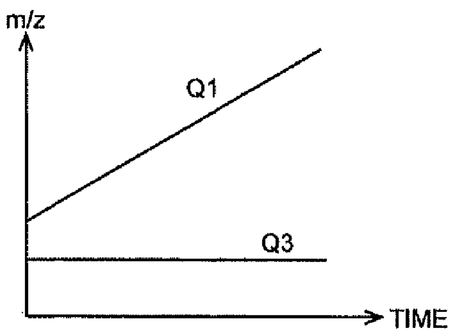

As yet another embodiment (third embodiment) of the present invention, a triple quadrupole mass spectrometer is hereinafter described by means of FIG. 5. FIG. 5 is a model diagram showing an operation characteristic of the triple quadrupole mass spectrometer of the third embodiment. The configuration of the present triple quadrupole mass spectrometer is basically identical to that of the second embodiment and hence will not be described.

In the case of the triple quadrupole mass spectrometer of the second embodiment, the delay time t for initiating the mass-scan operation of the third-stage quadrupole 17 under various dissociating conditions is stored as correction data in the mass-scan correction data memory 28. By contrast, in the triple quadrupole mass spectrometer of the third embodiment, a set of data for correcting the mass-to-charge ratio difference in the mass-scan operation is stored in the mass-scan correction data memory 28. That is to say, when a time delay of ions occurs in the collision cell 14, an ion having a predetermined mass-to-charge ratio and thereby allowed to pass through the first-stage quadrupole 13 will be introduced into the third-stage quadrupole 17 at a point in time delayed from the expected time. Therefore, the observed difference between the mass-to-charge ratio of the ion passing through the first-stage quadrupole 13 and that of the ion passing through the second-stage quadrupole 17 will actually be a decreased value. This problem can be solved by widening the mass-to-charge difference from ΔM to ΔM+m, where the added value m corresponds to the amount by which the mass-to-charge ratio difference is decreased from the expected value.

For example, the manufacturer of the present device determines an appropriate additional value m under various dissociating conditions and stores the obtained values as correction data in the mass-scan correction data memory 28. When a neutral loss scan measurement is performed on the user's side, the controller 24 determines the mass-to-charge ratio difference ΔM according to the mass-to-charge ratio of the neutral loss specified through the input unit 27, and retrieves, from the mass-scan correction data memory 28, the additional value m corresponding to the dissociating condition at that point in time. Then, the controller 24 determines a mass-scan pattern for the first-stage and third-stage quadrupoles 13 and 17 as shown in FIG. 5, and controls the Q1 power source 21 and the Q3 power source 23 according to that pattern. As a result, a product ion from which the specified neutral loss has been desorbed can be detected with high sensitivity in the neutral loss scan measurement. Furthermore, a mass spectrum having an accurate mass axis can be created in the data processor 25.

It should be noted that any of the previous embodiments is a mere example of the present invention, and any change, addition or modification appropriately made within the spirit of the present invention will be obviously included in the scope of claims of the present application.

The invention claimed is:

1. An MS/MS mass spectrometer including a first mass separator for selecting, as a precursor ion, an ion having a specific mass-to-charge ratio from various kinds of ions, a collision cell for dissociating the precursor ion by making the precursor ion collide with a collision-induced dissociation gas, and a second mass separator for selecting an ion having a specific mass-to-charge ratio from various kinds of product ions created by dissociation of the precursor ion, and the MS/MS mass spectrometer further includes:

a) a calibrating analysis execution means for collecting mass analysis data by analyzing a sample having a known mass-to-charge ratio by performing a mass scan in the first mass separator under a condition that a collision-induced dissociation gas is introduced into the collision cell while no substantial mass separation is performed in the second mass separator;

b) a calibration information memory means for creating mass calibration information for the first mass separator unit, based on the mass analysis data collected by the calibrating analysis execution means, the mass calibration information reflecting a time delay of an ion in the collision cell, and for memorizing the mass calibration information; and c) an actual analysis execution means for collecting mass analysis data for a target sample by controlling a mass-scan operation of the first mass separator by using the mass calibration information memorized in the calibration information memory means, at least when a neutral loss scan or a precursor ion scan is performed.

2. The MS/MS mass spectrometer according to claim 1, wherein:

the calibrating analysis execution means collects mass analysis data under various conditions in which at least one among the pressure of the collision-induced dissociation gas in the collision cell, the collision energy, and the mass-scan speed of the first mass separator is varied in plural ways; and the calibration information memory means creates and memorizes mass calibration information for each different condition.

3. An MS/MS mass spectrometer including a first mass separator for selecting, as a precursor ion, an ion having a specific mass-to-charge ratio from various kinds of ions, a collision cell for dissociating the precursor ion by making the precursor ion collide with a collision-induced dissociation gas, and a second mass separator for selecting an ion having a specific mass-to-charge ratio from various kinds of product ions created by dissociation of the precursor ion, further comprising:

a) an input means for allowing a user to input a difference in the mass-to-charge ratio between the first mass separator and the second mass separator in a neutral loss scan measurement, or to input information based on which the aforementioned difference in the mass-to-charge ratio can be determined;

b) a correction means for correcting the difference in the mass-to-charge ratio inputted through the input means or calculated on a basis of the aforementioned information, by adding a predetermined value to the difference in the mass-to-charge ratio; and c) a measurement execution means for controlling mass-scan operations of the first mass separator and the second mass separator so as to perform a neutral loss scan measurement based on the corrected value of the difference in the mass-to-charge ratio.

4. The MS/MS mass spectrometer according to claim 3, wherein:

the MS/MS mass spectrometer further comprises a memory means in which information on the additional value for correcting the difference in the mass-to-charge ratio is held for each of a variety of values in which at least one factor among the pressure of the collision-induced dissociation gas in the collision cell, the collision energy, and the mass-scan speed of the first mass separator is varied in plural ways; and the correction means corrects the difference in the mass-to-charge ratio by using the information memorized in the memory means.

5. An MS/MS mass spectrometer including a first mass separator for selecting, as a precursor ion, an ion having a specific mass-to-charge ratio from various kinds of ions, a collision cell for dissociating the precursor ion by making the precursor ion collide with a collision-induced dissociation gas, and a second mass separator for selecting an ion having a specific mass-to-charge ratio from various kinds of product ions created by dissociation of the precursor ion, further comprising:

a) an input means for allowing a user to input a difference in the mass-to-charge ratio between the first mass separator and the second mass separator in a neutral loss scan measurement, or to input information based on which the aforementioned difference in the mass-to-charge ratio can be determined; and b) a measurement execution means for conducting mass-scan operations of the first mass separator and the second mass separator so as to perform a neutral loss scan measurement based on the difference in the mass-to-charge ratio inputted through the input means or calculated on a basis of the aforementioned information, wherein a point of initiation of the mass-scan operation of the second mass separator is delayed from a point of initiation of the mass-scan operation of the first mass separator by a previously determined period of time.

6. The MS/MS mass spectrometer according to claim 5, wherein:

the MS/MS mass spectrometer further comprises a memory means in which time information used for delaying the point of initiation of the mass-scan operation of the second mass separator is held for each of a variety of values in which at least one factor among the pressure of the collision-induced dissociation gas in the collision cell, the collision energy, and the mass-scan speed of the first mass separator is varied in plural ways; and the measurement execution means uses the time information held in the memory means to delay the initiation of the mass-scan operation of the second mass separator from the point of initiation of the mass-scan operation of the first mass separator by the previously determined period of time.

* * * * *